(12) United States Patent
Alsaadi

(10) Patent No.: US 6,338,142 B1
(45) Date of Patent: Jan. 8, 2002

(54) METHOD AND APPARATUS FOR PROVIDING SECURE LOCKOUT IN ELECTRONIC DEVICES

(75) Inventor: Akram Johar Alsaadi, Sanaa (YE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/991,656

(22) Filed: Dec. 16, 1997

(51) Int. Cl.[7] .............................. G06F 1/30; G06F 1/32
(52) U.S. Cl. ...................... 713/323; 713/320; 713/324; 713/340
(58) Field of Search ..................... 712/1; 379/102.04; 709/221; 368/156; 323/272

(56) References Cited

U.S. PATENT DOCUMENTS

| | | | |
|---|---|---|---|
| 4,647,721 A | * | 3/1987 | Busam et al. .......... 379/102.04 |
| 5,142,217 A | * | 8/1992 | Gontowski, Jr. ............ 323/272 |
| 5,715,465 A | * | 2/1998 | Savage et al. .............. 395/750 |
| 5,835,719 A | * | 11/1998 | Gibson et al. .............. 709/221 |
| 5,910,930 A | * | 6/1999 | Dieffenderfer et al. ..... 368/156 |

* cited by examiner

*Primary Examiner*—Reba I. Elmore
(74) *Attorney, Agent, or Firm*—Kenyon & Kenyon

(57) ABSTRACT

A method and apparatus for preventing unauthorized use and therefore enhanced security in electronic devices. Upon power down, conventional modes of power up are disabled. A lockout circuit disables "wake up" events which would otherwise restart the device. A power supply is responsive to power on signals generated by a power controller. The lockout circuit generates an interfering signal that obscures power on signals generated by the power controller. The lockout circuit generates the signal when triggered by a triggering device, which may be a switch or an Ethernet chip. The lockout circuit ceases to generate the interrupt signal when released by a releasing device, which may be a switch, an Ethernet chip or a modem.

22 Claims, 3 Drawing Sheets

METHOD AND APPARATUS FOR PROVIDING SECURE LOCKOUT IN ELECTRONIC DEVICES

The present invention relates to electronic devices and, more particularly, to a method and apparatus for preventing unauthorized use of such electronic devices.

BACKGROUND OF THE INVENTION

Electronic devices, such as personal computers and workstations, have proliferated in the modern business and home arena. With this proliferation, security has become an increasing concern. Modern devices serve as a repository of highly sensitive information which, if misused or misappropriated, can cause financial and competitive loss. Accordingly, protection of such information has become a practical necessity.

Password protection is a useful security precaution but such protection is not failproof. Passwords are subject to eavesdropping and, when misappropriated, permit unauthorized users to access subject matter under the password. Also, passwords provide limited protection against "rogue employees" and the like, persons who may have authorized access to passwords for limited purposes and are likely to use the passwords for unauthorized purposes. Further, even if password protection is maintained, unauthorized users may be able to glean useful information through observation of unprotected elements of a system.

One of the most powerful means of protecting electronic devices against unauthorized use is to force them to remain in an unpowered state at all times except during authorized use. In such a state, for example, information present on magnetic, optical or ROM memories cannot be read out and misappropriated. However, no known system turns an electronic device off and maintains the device off against "wake up" events, conventional methods to turn it on. Accordingly, there is a need in the art for a security system in electronic devices that maintains electronic devices powered down against unauthorized attempts to restore power to such devices.

SUMMARY OF THE INVENTION

An embodiment of the present invention disables power up events in an electronic device. This embodiment includes a lockout circuit that interrupts power up signals transmitted from a power controller to a power supply in response to a triggering signal.

DETAILED DESCRIPTION

Figure 1:
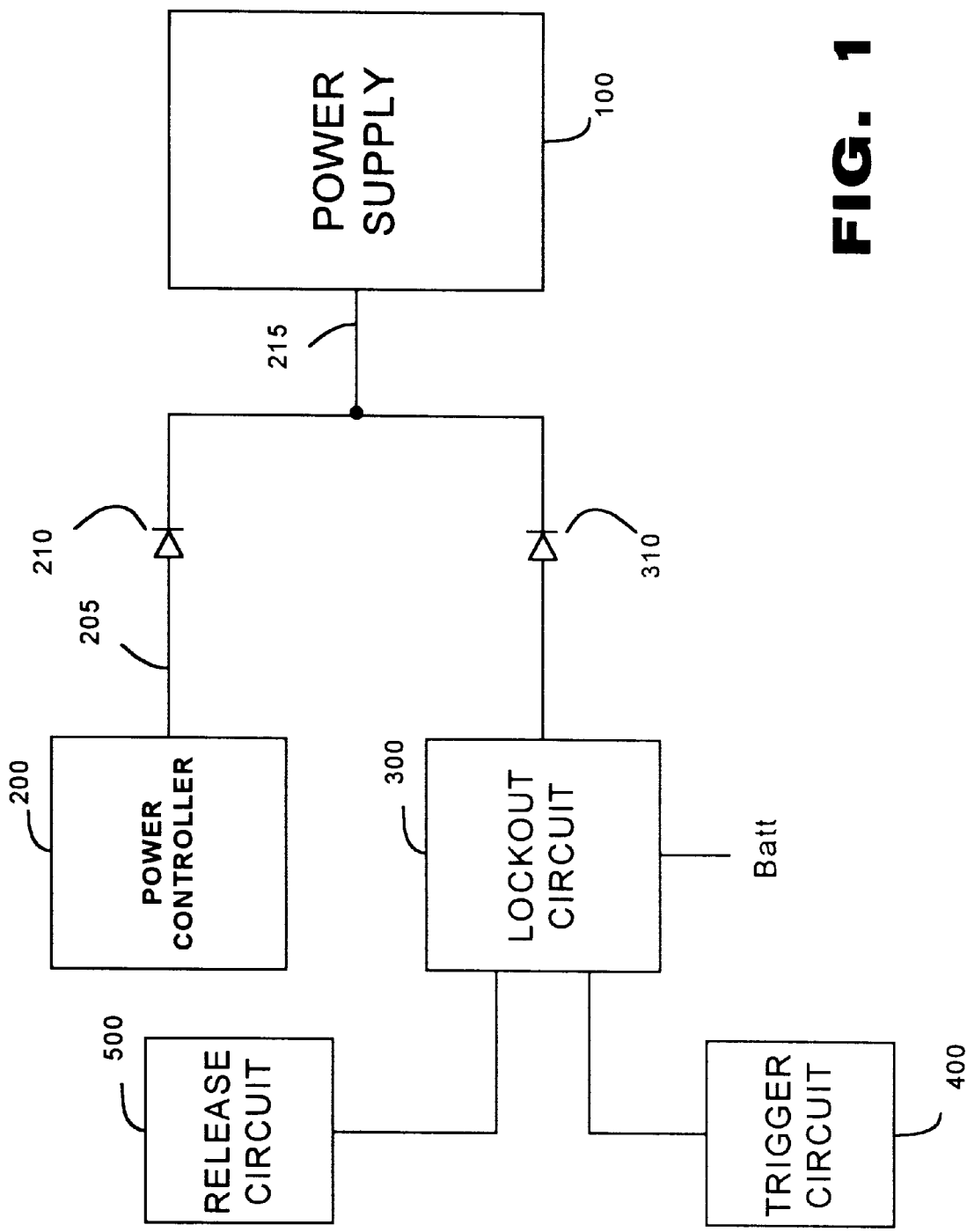
FIG. 1 is a block diagram of the present invention constructed in accordance with a first embodiment.

Turning now to the drawings, FIG. 1 illustrates an embodiment of a system of the present invention which can be installed within an electronic device. It includes a power supply 100 and a power controller 200 coupled to the power supply 100. The power supply 100 supplies power throughout a device in which illustrated embodiment is installed according to conventional techniques. The power controller 200 initializes a power on operation. The power controller may be coupled to the power supply through a diode 210 over lines 205 and 215.

During idle operation, the power controller 200 maintains line 215 high. To signal a power on event, the power controller 200 drives line 215 low momentarily. This momentary change in state signals the power supply 100 to power other components within the device. In response, the power supply 100 distributes power to the remainder of the device. A power off event occurs when the power controller 200 pulls line 215 low a second time.

The illustrated embodiment of the present invention provides a lockout circuit 300 coupled to line 215. An output of the lockout circuit 300 is coupled to line 215 through a diode 310. Outputs of the two diodes 210 and 310 are joined, establishing a logical OR between the power controller 200 and the lockout circuit 300. If either the power controller 200 or the lockout circuit 300 generate a high signal, the input to the power supply 100 is high. For the input to power supply 100 to go low (and signal the power on event) both the power controller 200 and the lockout circuit 300 must go low. When triggered, the lockout circuit 300 generates a constant high signal, thereby obscuring any power on signals generated by the power controller 200. The lockout circuit 300 continues to drive line 215 high until the lockout circuit 300 is released.

The states described above illustrate the operative principles of the present invention. They may be voltage controlled or current controlled states. And, with proper modifications, state levels may be inverted consistent with the principles of the invention.

Figure 2:
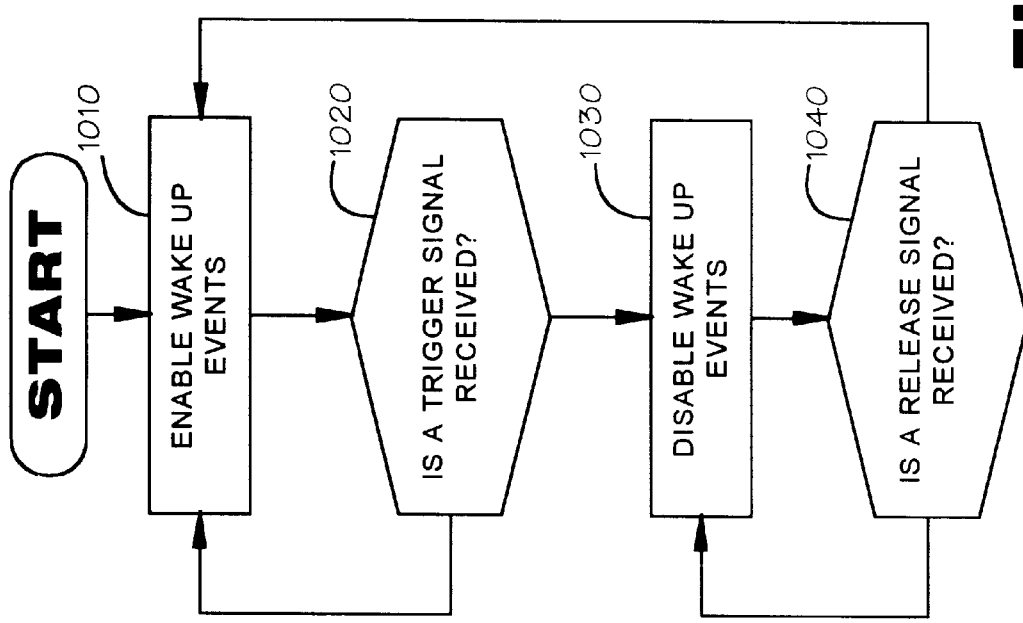
FIG. 2 is a flow diagram illustrating a method of operation of an embodiment of the present invention.
Figure 3:
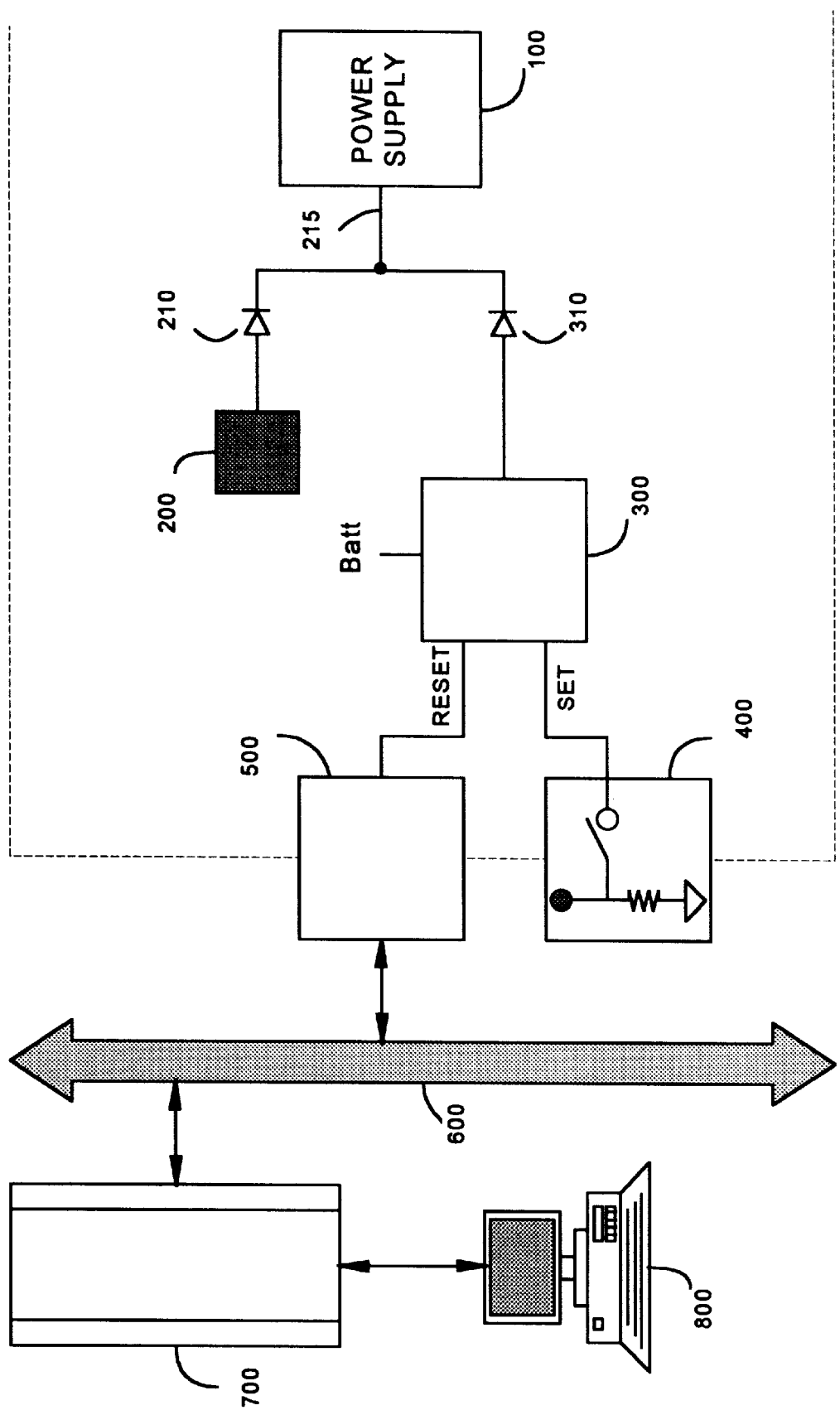
FIG. 3 is a block diagram of the present invention constructed in accordance with a second embodiment.

In an embodiment, the lockout operates in accordance with the method illustrated in FIG. 2. There, the system generates a power up signal in response to traditional power up stimuli (activation of power switch, mouse or keyboard activity in powered down devices) (Step 1010). The power up signal is input to the power supply (Step 1020). When a trigger signal is received (Step 1030), an interfering signal is generated (Step 1040). The interfering signal is not generated until the triggering signal is received.

The interfering signal masks the power up signal (Step 1050). The masked signal is input to the power supply (Step 1060). Due to the presence of the interfering signal, any power up signal generated while the interfering signal is present will not cause the device to power up.

When a releasing signal is received (Step 1070), the interfering signal is discontinued (Step 1080). The method returns to Step 1010. Any power up signal generated before the next triggering signal causes a power up to occur.

Inputs of the lockout circuit 300 are coupled to a trigger circuit 400 and a release circuit 500. The trigger circuit 400 causes the lockout circuit 300 to generate a high output. The trigger circuit 400 may be any of a host of triggering devices as desired by a system operator. The trigger circuit 400 simply may be a switch provided on a chassis of the device. Upon power down, an operator engages the switch to lockout the device from unauthorized use. In another alternative, where a computer or workstation is connected to an Ethernet network, the trigger circuit 400 may be an Ethernet chip. Upon receipt of a lockout message received over an Ethernet connection, the Ethernet chip triggers the lockout circuit 300.

The release circuit 500 releases the lockout circuit 300, causing the circuit 300 to generate a low output. The release circuit 500 may be any one of several devices including those noted above for the triggering circuit 400. Thus, The release circuit 500 also may be an Ethernet chip, but one that releases the lockout circuit 300 in response to commands received from an Ethernet network. Alternatively, the release circuit 500 may be a modem. The modem would be coupled to a telephone line and programmed to release the lockout circuit 300 when so commanded over the telephone line.

Although the same types of devices may be used as the triggering circuit 400 and the releasing circuit 500, they should be implemented differently on a single device. For example, although a pair of switches may be provided on a workstation chassis to act as trigger and release circuits, their physical proximity may not achieve optimal security.

In one embodiment, the trigger circuit 400 is provided as a switch on a chassis of the device and the release circuit 500 is provided as an Ethernet chip, as shown in FIG. 2. This embodiment permits anyone at the device to trigger the lockout circuit 300, but one must have access to the Ethernet network to release it. The trigger device 400 is a single pole switch coupled to the lockout circuit 300 and affixed to the chassis of the device. The release circuit 500 is an Ethernet controller coupled to an Ethernet bus 600. The Ethernet controller 500 communicates with a server 700 over the bus 600. A system administrator controls operation of the server 700 from a terminal 800.

The lockout circuit 300 in the embodiment of FIG. 2 is intended to be triggered by an operator at the device. At that point, the lockout circuit 300 disables normal power up events triggered at the device, such as plugging and unplugging the device from wall power, pushing power buttons and the like. The device will power up only in response to a command received from the server 700 over the Ethernet bus 600. To power up the device, the operator typically will be required to contact a system operator 800 to command the server 700 to send a "wake up" message to the device via the Ethernet connection 600. Alternatively, the system operator 800 may program the server 700 to send wake up messages at predetermined times, such as the beginning of each business day.

The lockout circuit 300 is powered by an on-board battery (shown in FIG. 1) providing limited immunity from ordinary attempts to disable the circuit 300 such as by unplugging the device from wall power. Also, the release circuits 500 are powered by a battery or other independent power supply. They are not powered by the power supply 100 because, otherwise, the circuits 500 would be powered down and remain unresponsive to release commands received from outside sources.

As an example, a bistable circuit such as a conventional flip-flop circuit may be used as the lockout circuit 300. The trigger circuit 400 and the release circuit 500 are coupled to the SET and RESET terminals of the flip-flop in this example.

Also, as an example, the power controller 200 may be an integrated circuit, such as model no PC87307VUL manufactured by the National Semiconductor Corporation ("the '307 chip"). The power supply 100 may be any one of a number of commercially available power supplies that are responsive to power up signaling. If the '307 chip is used, the power controller 200 interconnects with the power supply 100 via the $\overline{\text{ONCTL}}$ pin provided on the '307 chip. An Ethernet chip for use in the present invention may be an integrated circuit, such as the PCnet-ISA II single-chip Ethernet controller available from American Micro Devices using the known "Magic Packet" technology.

As described, the present invention provides a security system in electronic devices that maintain the devices powered down against unauthorized attempts to restore power to such devices.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. An apparatus for disabling wake up events in an electronic device, comprising:
   a power supply having an input for a power up signal,
   a power controller having an output coupled to the power up signal input,
   a lockout circuit, having an output coupled to the power up signal input, responsive to a triggering signal to generate an interfering signal that obscures the power up signal.

2. The apparatus of claim 1, wherein the lockout circuit is a flip-flop circuit.

3. The apparatus of claim 1, further comprising:
   a triggering circuit coupled to the lockout circuit, for generating the triggering signal.

4. The apparatus of claim 3, wherein the triggering circuit is a switch.

5. The apparatus of claim 3, wherein the triggering circuit is an Ethernet chip.

6. The apparatus of claim 1, wherein the lockout circuit is responsive to a release signal by ceasing to generate the interfering signal.

7. The apparatus of claim 6, further comprising a release circuit coupled to the lockout circuit for generating the release signal.

8. The apparatus of claim 7, wherein the release circuit is an Ethernet chip.

9. The apparatus of claim 7, wherein the release circuit is a switch.

10. The apparatus of claim 7, wherein the release circuit is a modem.

11. The apparatus of claim 1, wherein the lockout circuit is battery powered.

12. Secure apparatus for disabling wake up events in an electronic device, comprising:
    a power supply responsive to a power up signal,
    a power controllers coupled to the power supply, to generating the power up signal,
    a lockout circuit, responsive to a triggering signal by generating an interfering signal and responsive to a release signal by ceasing to generate the interfering signal, coupled to the power supply in such a manner as to obscure the power up signal,
    a triggering circuit coupled to the lockout circuit that generates the triggering signal, and
    a release circuit separate from the triggering circuit coupled to the lockout circuit that generates the release signal.

13. The apparatus of claim 12, wherein
    the lockout circuit is a flip-flop circuit,
    the triggering circuit is input to the flip-flop circuit at a SET terminal thereof, and
    the release circuit is input to the flip-flop circuit at a RESET terminal thereof.

14. A method of disabling power up events in electronic devices, comprising the steps of:
    generating a power up signal to a power supply, and
    in response to a triggering signal:
    generating an interfering signal that masks the power up signal, combining the power up signal with the interfering signal, and inputting the combined signal to the power supply.

15. The method of claim 14, further comprising a step of ceasing, in response to a release signal, to generate the interfering signal.

16. The method of claim 14, wherein the step of generating the power up signal is performed in response to a power up stimulus.

17. The method of claim 14, further comprising a step of, in the absence of the triggering signal, inputting the power up signal to the power supply.

18. A method of locking out electronic devices against power up, comprising:

generating a power up signal in response to a power up stimulus, combining the power up signal with an interfering signal that obscures the power up signal and inputting the combined signal to a power supply in response to a triggering signal, otherwise, inputting the power up signal to the power supply.

19. The apparatus of claim 1, wherein the power controller output is coupled to the power up signal input through a first diode and the lockout circuit output is coupled to the power up signal input through a second diode.

20. The apparatus of claim 1, wherein the power controller output and the lockout circuit output are coupled to the power up signal input in such a manner as to establish a logical OR between the power controller output and the lockout circuit output.

21. The apparatus of claim 12, wherein the power controller is coupled to the power supply through a first diode and the lockout circuit is coupled to the power supply through a second diode.

22. The apparatus of claim 12, wherein the power controller and the lockout circuit are coupled to the power supply in such a manner as to establish a logical OR between the power controller and the lockout circuit.

* * * * *